United States Patent
Nikam et al.

(10) Patent No.: US 12,267,352 B2
(45) Date of Patent: *Apr. 1, 2025

(54) REST API SCANNING FOR SECURITY TESTING

(71) Applicant: Qualys, Inc., Foster City, CA (US)

(72) Inventors: Ganesh Nikam, Pune (IN); Akash Shah, Pune (IN)

(73) Assignee: Qualys, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,411

(22) Filed: Oct. 16, 2023

(65) Prior Publication Data

US 2024/0064167 A1 Feb. 22, 2024

Related U.S. Application Data

(63) Continuation of application No. 17/683,214, filed on Feb. 28, 2022, now Pat. No. 11,792,221, which is a (Continued)

(51) Int. Cl.
*H04L 9/40* (2022.01)
*G06F 9/445* (2018.01)
(Continued)

(52) U.S. Cl.
CPC ...... *H04L 63/1433* (2013.01); *G06F 9/44505* (2013.01); *G06F 9/541* (2013.01); (Continued)

(58) Field of Classification Search
CPC ............ H04L 63/1433; H04L 63/1466; H04L 67/133; H04L 67/02; G06F 9/44505; G06F 9/541; G06F 9/547; G06F 16/951
See application file for complete search history.

(56) References Cited

U.S. PATENT DOCUMENTS

| 10,789,360 B2 | 9/2020 | Johns |
| 11,265,342 B2 | 3/2022 | Nikam et al. |

(Continued)

OTHER PUBLICATIONS https://www.microfocus.com/en-us/products/webinspect-dynamic-analysts-dast/overview#block3/, downloaded Sep. 11, 2020, 9 pages.

(Continued)

*Primary Examiner* — Brian W Wathen
(74) *Attorney, Agent, or Firm* — Baker & McKenzie LLP

(57) ABSTRACT

Methods and systems for securing an application programming interface (API) are presented. The method comprises: receiving API workflow data associated with an API testing tool and generating a scan configuration file using the API workflow data; crawling the collection of API requests by identifying and retrieving a link associated with the collection of API requests; and crawling the link to generate a crawled link response. The method also includes executing one or more vulnerability tests on the crawled link response including applying at least one passive detection rule to the crawled link response and fuzzing the link. The fuzzed link may be transmitted in a request to an application server following which scan data indicative of at least one vulnerability associated with a response from the application server may be generated. The scan data may be used to generate a vulnerability report.

22 Claims, 6 Drawing Sheets

Related U.S. Application Data continuation of application No. 16/920,380, filed on Jul. 2, 2020, now Pat. No. 11,265,342.

(51) Int. Cl.
  *G06F 9/54* (2006.01)
  *G06F 16/951* (2019.01)
  *H04L 67/133* (2022.01)

(52) U.S. Cl.
  CPC ............ *G06F 9/547* (2013.01); *G06F 16/951* (2019.01); *H04L 63/1466* (2013.01); *H04L 67/133* (2022.05)

(56) References Cited

U.S. PATENT DOCUMENTS

| | | | | |
|---|---|---|---|---|
| 11,792,221 | B2* | 10/2023 | Nikam | H04L 67/133 726/25 |
| 2011/0078798 | A1 | 3/2011 | Chen et al. | |
| 2018/0255089 | A1 | 9/2018 | Wilton et al. | |
| 2018/0349602 | A1 | 12/2018 | Johns | |
| 2019/0303484 | A1 | 10/2019 | Baskinger et al. | |
| 2020/0074087 | A1 | 3/2020 | Amit et al. | |
| 2020/0285686 | A1* | 9/2020 | Murray | G06F 21/31 |
| 2020/0301674 | A1 | 9/2020 | Swope et al. | |
| 2021/0042207 | A1* | 2/2021 | Joyce | G06F 11/3612 |
| 2021/0109845 | A1 | 4/2021 | Shah et al. | |
| 2022/0006829 | A1 | 1/2022 | Nikam et al. | |

OTHER PUBLICATIONS https://www.microfocus.com/documentation/fortify-webinspect/1920/FortifySW_RN_19.2.0/, Nov. 21, 2019, 7 pages.

https://www.acunetix.com/blog/news/acunetix-v13-release/, Feb. 5, 2020, 7 pages.

https://www.acunetix.com/vulnerability-scanner/imports-exports/, downloaded Sep. 14, 2020, 5 pages.

https://www.acunetix.com/blog/docs/what-are-import-files/, Mar. 20, 2020, 6 pages.

https://www.netsparker.com/web-vulnerability-scanner/manuals/scanning-first-website/optional-web-security-scan-settings/importing-urls-and-http-requests-prior-to-a-scan/, downloaded Sep. 14, 2020, 3 pages.

https://restful.io/ojects-at-rest-part-1-what-is-it_3e26f0978616/, Mar. 7, 2016, 11 pages.

https://gorillalogic.com/blog/rest-api-testing-part-1-get-started-with-postman-swagger-and-assertible/, Mar. 1, 2018, 11 pages.

https://www.acunetix.com/blog/news/acunetix-v13-release/, Sep. 11, 2020, 6 pages.

https://netsparker.com/web-vulnerability-scanner/manuals/scanning-first-website/optional-web-security-scan-settings/importing-urls-and-http-requests-prior-to-a-scan/, Sep. 11, 2020, 2 pages.

https://docs.rapid7.com/insightappsec/scan-configuration/, downloaded Feb. 5, 2020, 3 pages.

* cited by examiner

REST API SCANNING FOR SECURITY TESTING

CROSS-REFERENCE TO RELATED APPLICATIONS

This application claims priority to, and is a continuation of U.S. patent application Ser. No. 17/683,214 filed Feb. 28, 2022, which claims priority to, and is a continuation of U.S. application Ser. No. 16/920,380 filed Jul. 2, 2020, now U.S. Pat. No. 11,265,342 issued on Mar. 1, 2022, the disclosures of which are all incorporated herein by reference in their entirety for all purposes.

TECHNICAL FIELD

The present disclosure relates to methods, systems, and apparatuses for testing REST APIs.

BACKGROUND

Most businesses today use some form of application programming interface (API) to provide various services and functionalities to users. APIs allow users to transfer information between systems within and outside a given organization. APIs associated with a website, for example, may include code/logic that allow at least two software programs to communicate data between each other. There is a need to secure APIs against threats and vulnerabilities.

SUMMARY

APIs are developed and configured for optimal performance and implementation in various systems. For example, representational state transfer (REST) APIs are optimized for use on the internet because REST APIs use relatively less bandwidth compared to similar technologies.

Sensitive data such as passwords, credit card data, personal data, as well as other exploitable data are transmitted back and forth during the usage of a REST API, for example. Thus, methodologies and processes for security testing of an API and/or security testing of API related data can help secure a REST API, for example, against a plurality of threats and vulnerabilities.

Methods and systems for securing an application programming interface (API) are presented in this disclosure. According to one aspect of the subject matter disclosed, the method comprises receiving API workflow data associated with an API testing tool and generating a scan configuration file based on the API workflow data. The scan configuration file is executable to assess a security posture of an API based on a collection of API requests associated with the API workflow data. The method may also include crawling the collection of API requests. Crawling the collection of API requests includes identifying and retrieving a link associated with the collection of API requests and crawling the link to generate a crawled link response. Additionally, the method includes executing one or more vulnerability tests on the crawled link response. According to some implementations, executing vulnerability tests includes applying at least one passive detection rule to the crawled link response and fuzzing the link retrieved following which a request, comprised in the collection of API requests and including the fuzzed link, is transmitted to an application server. The method may include generating scan data indicative of at least one vulnerability associated with a response from the application server and generating a vulnerability report based on the scan data. According to some embodiments, the vulnerability report may be used to secure the API against the at least one vulnerability.

These and other implementations may each optionally include one or more of the following features. The API is a representational state transfer (REST) API; the API testing tool includes a POSTMAN tool; and the API workflow data includes a script associated with the API testing tool. In some embodiments, the collection of API requests comprises a collection of tests indicative of scenario-based tests and sequence-based tests associated with the API workflow data. Furthermore, the one or more vulnerability tests comprise a plurality of different vulnerability tests. In addition, crawling the collection of API requests may comprise determining one or more endpoints associated with accessing a resource of the application server.

According to some implementations, the at least one vulnerability includes one or more of: a cross-site request forgery vulnerability, a cross site scripting vulnerability, and an SQL injection vulnerability.

In some instances, the API testing tool is natively integrated into a web application scanner. The web application scanner includes a user interface configured to receive the API workflow data previously mentioned. The web application scanner may be a cloud-based security system according to some embodiments.

Other implementations of one or more of these aspects include corresponding systems, apparatus, and computer program products, configured to perform the actions of the methods encoded on computer storage devices.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion. Additionally, the various elements shown in the figures that follow may be optional depending on a given embodiment without departing from the principles provided in this disclosure.

DETAILED DESCRIPTION

Figure 1:
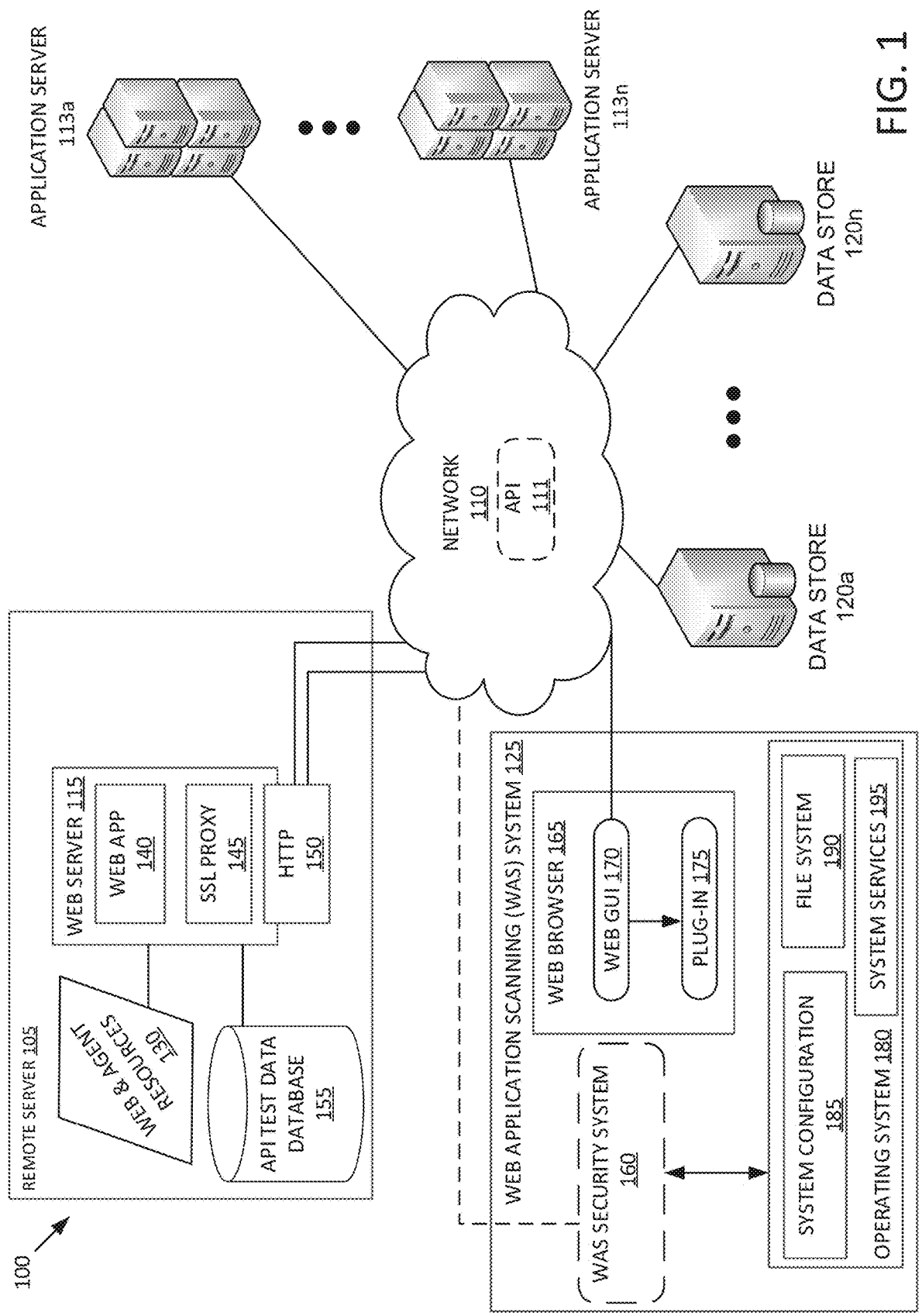
FIG. 1 is a high-level network system within which a web application scanning system for securing a REST API may be implemented, according to one implementation of this disclosure.

The present disclosure describes various techniques and apparatuses for security testing of an application programming interface (API) to assess a security posture of the tested API. The security posture of an API may refer to the overall security status of the API in question and may include vulnerabilities associated with controls, measures, and/or workflows associated with the API in question. According to some implementations, the security posture of the API may indicate a capacity to develop and/or manages defenses against the vulnerabilities of the API. In some cases, the security posture of the API may provide insight into effective security methodologies to adopt in securing the API from security threats.

APIs such as representational state transfer (REST) APIs are increasingly becoming popular for use in web applications. Unlike other APIs, REST APIs are structured to make use of standards such as Hypertext Transfer Protocol (HTTP), Uniform Resource Identifier (URI), JavaScript Object Notation (JSON), and Extensible Markup Language (XML). In the context of HTTP, REST APIs provides methods that allow an application server to expose its functionality to clients. According to some embodiments, clients may include HTTP endpoints that require different operations to be performed by objects associated with the application server. These operations may include creating an object, reading an object, updating an object, and deleting an object. For example, the endpoint may use methods such as POST, GET, PUT/PATCH, and DELETE to respectively create, read, update, and delete an object associated with the application server. It is appreciated that the functionality of the application server may also be exposed to the endpoints using other HTTP methods other than those outlined above. Additionally, it is appreciated that while the foregoing discussion is made in the context of HTTP, the methods, systems, and computer program products discussed in this disclosure are applicable to other technologies such as URIs, JSONs, and XMLs.

According to some implementations, REST APIs can allow computing systems to communicate with one another. Each computing system coupled to the REST API may be considered an endpoint depending on its functionality. An endpoint can include a URL of a server or a service and can also be considered as a location from which the REST API can access resources to execute one or more of its functions. REST APIs use functions associated with requests and responses. When a REST API requests information from, for example, a web application or a web server, it will receive a response. The "place" that the API sends requests for the resource and where the resource "resides" can be considered an endpoint.

REST APIs make it easy to "plug-in" an application's functionality into a third-party tool. As an example, a REST API may allow an application running on a first server to access the functionality of another application running on a second server and thereby allow users of the first server to create, read, update, and delete records associated with the application running on the first server. Such use of REST APIs can be tested based on a plurality of scenarios to determine whether the API functions as desired. Additionally, data resulting from such tests can be further analyzed to assess the security posture of the REST API. The sections that follow provide systems and methods for analyzing API test data in order to secure a given API from security threats and other vulnerabilities.

System Environment

Illustrated in FIG. 1 is a high level network system 100 within which a web application scanning system for securing a REST API may be implemented. In the depicted implementation, the system 100 may include a remote server 105 coupled to a network 110. The network system 100 may also include a web application scanning system (WAS) 125, a plurality of application servers 113a . . . 113n, and a plurality of data stores 120a . . . 120n communicatively coupled to each other and to the remote server 105 via the network 110. While a single remote server 105 is illustrated, the disclosed principles and techniques could be expanded to include multiple remote servers. Similarly, while a single WAS 125 is illustrated, the disclosed principles and techniques are expandable to multiple endpoint devices and multiple public record repositories.

In some embodiments, the remote server 105 may include a computing device such as a mainframe server, a content server, a communication server, a laptop computer, a desktop computer, a handheld computing device, a smart phone, a wearable device, a touch screen, a biometric device, a video processing device, an audio processing device, a virtual machine, a cloud-based computing solution and/or service, and/or the like. The remote server 105 may include a plurality of computing devices configured to communicate with one another and/or implement the techniques described herein.

In some instances, the remote server 105 may include various elements of a computing environment as described with reference to FIG. 2 and/or FIG. 3. For example, the remote server 105 may include processing unit 202, a memory unit 204, an input/output (I/O) unit 206, and/or a communication unit 208. A user (e.g., network administrator) may operate the remote server 105 either locally or remotely.

The remote server 105 may include a web server 115, a web and agent resources 130, and an API test data database 155. The web server 115, the web and agent resources 130, and the API test data database 155 may be communicatively coupled to each other and to the network 110 via one or more wired or wireless communication links.

The web server 115 may include a secure socket layer (SSL) proxy 145 for establishing HTTP-based connectivity 150 between the remote server 105 and other devices coupled to the network 110. Other forms of secure connection techniques, such as encryption, may be employed on the web server 115 and across the network 110. Additionally, the web server 115 may deliver artifacts (e.g., binary code, instructions, results, etc.) to other components of the system 100 either directly via the SSL proxy 145 and/or via the network 110 using the web application 140. The web and agent resources 130 of the remote server 105 may be provided to the WAS system 125 via the web app 140 on the web server 115. The web and agent resources 130 may be used to render a web-based graphical interface (GUI) 170 via the browser 155 running on the WAS system 125. The API test data database may be used to store data associated with testing API operations by one or more endpoints (e.g., WAS system 125).

The WAS security system 160 of the WAS system 125 may analyze and/or process local or remote API test data such as API test data stored on the API test data database 155 as further discussed below. In some implementations, the WAS security system 160 may access an operating system 180 of the WAS system 125 in order to execute a plurality of security operations. For instance, the WAS security system 160 may access the operating system 180 in order to scan a security posture of the WAS system 125 by scanning a system configuration 185, a file system 190, and/or system services 195 of the WAS system 125. The plug-in 175 of the web browser 155 may provide needed downloads that facilitate operations executed by the operating system 180, the WAS security system 160, and/or other applications associated with the WAS system 125.

According to some implementations, WAS security system 160 can determine whether API test data indicates vulnerabilities associated with a given API (e.g., API 111) and generate a report or scan data. The scan data may include a listing of identified attributes of an identified vulnerability, a count of identified attributes of an identified vulnerability, a vulnerability type of each identified vulnerability, etc. According to some implementations, the WAS security system may provide recommendations for addressing an identified vulnerability associated with a given API. For example, the WAS security system 160 may be configured to execute security operations including preparedness operations such as processes for dealing with security incidents/breaches/compromises associated with an identified API vulnerability; detection and analysis operations such as identifying and investigating suspicious activity associated with API security events; containment, eradication, and recovery operations including determining the nature of an API security event; and post incident activity including preventative measures that prevent previous security breaches of API vulnerabilities from subsequently reoccurring.

It is appreciated that the WAS system 125 may include a handheld computing device, a smart phone, a tablet, a laptop computer, a desktop computer, a personal digital assistant (PDA), a wearable device, a biometric device, an implanted device, a camera, a video recorder, an audio recorder, a touchscreen, a computer server, a virtual server, a virtual machine, and/or a video communication server. In some embodiments, the WAS system 125 may include a plurality of endpoints computing devices configured to communicate with one another and/or implement the techniques described herein.

The network system 110 may include a plurality of networks. For instance, the network 110 may include any wired/wireless communication network that facilitates communication between the components of the network system 100. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like. While the API 111 is depicted as being implemented within the network 110, it is appreciated that the API 111 may be implemented on the WAS system 125, the remote server 105, a data store 120, and on an application server 113. According to some implementations, API 111 is a REST API configured to expose a functionalities of applications associated with the plurality of data stores 120$a$ . . . 120$n$ and/or functionalities associated with application servers 113$a$ . . . 113$n$.

Figure 2:
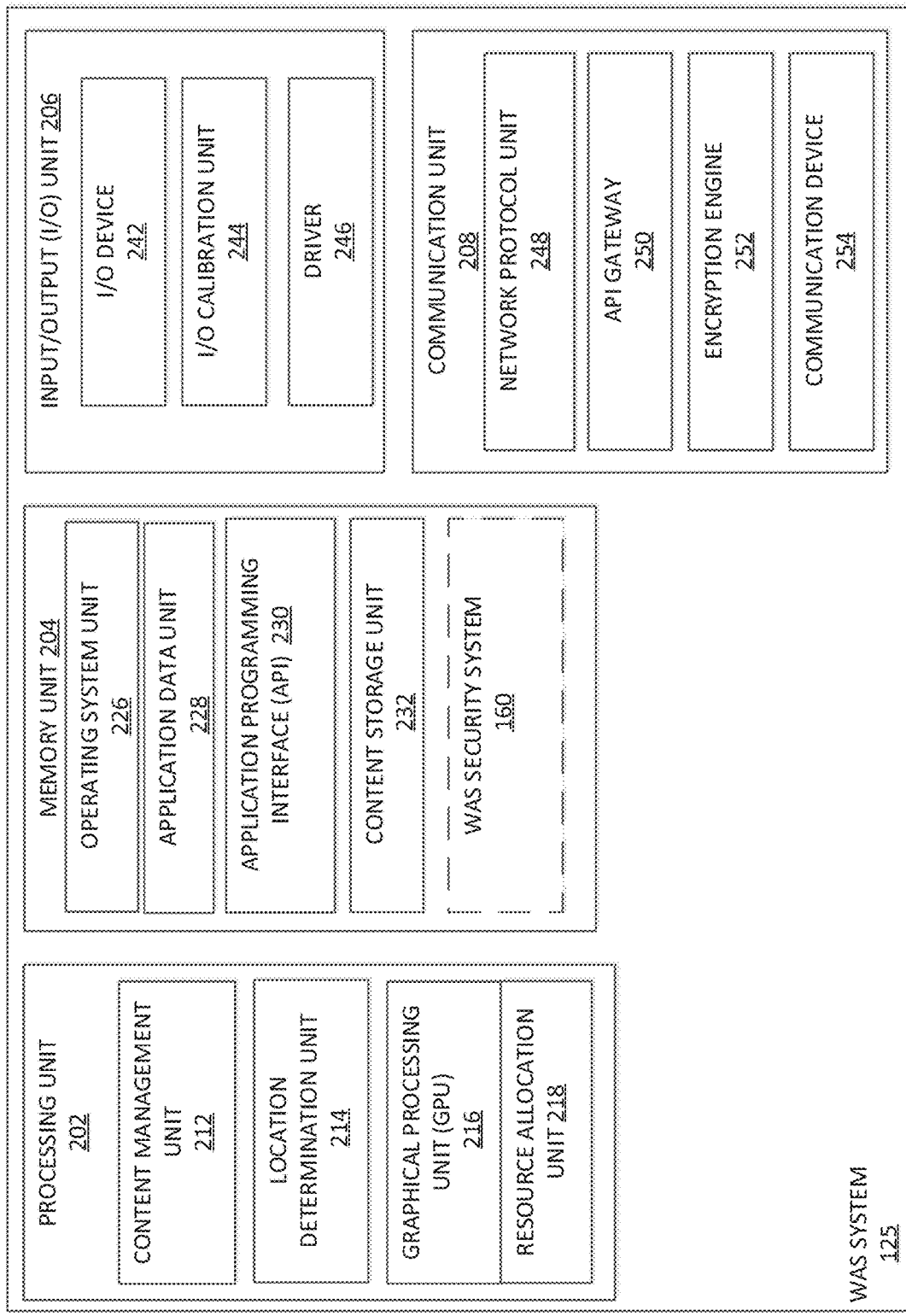
FIG. 2 is a functional block diagram of a web application scanning system for securing a REST API, according to one implementation of this disclosure.
Figure 3:
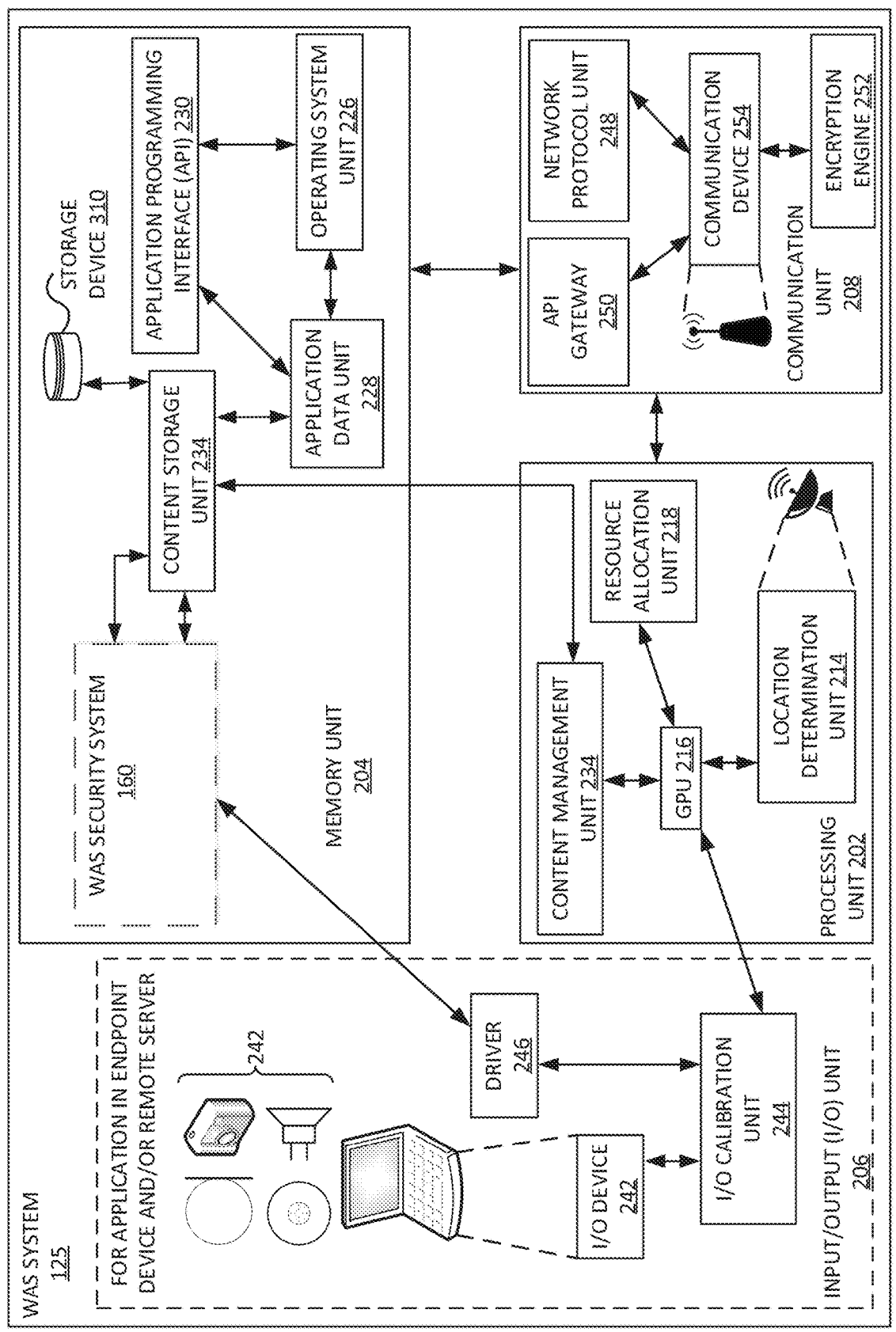
FIG. 3 is a detailed system diagram of the web application scanning system of FIG. 2, according to one implementation of this disclosure.

FIGS. 2 and 3 illustrate exemplary functional and system diagrams of WAS system 125 for securing a REST API. Specifically, FIG. 2 provides exemplary aspects of the WAS system 125, whereas FIG. 3 provides exemplary relationships between the exemplary aspects of the WAS system 125.

As seen in FIG. 2 and FIG. 3, the WAS system may include a processing unit 202, a memory unit 204, an I/O unit 206, and a communication unit 208. The processing unit 202, the memory unit 204, the I/O unit 206, and the communication unit 208 may include one or more subunits for performing operations described herein. Additionally, each unit and/or subunit may be operatively and/or otherwise communicatively coupled with each other so as to facilitate the operations described herein. The WAS system 125 may include any of its units and/or subunits may include general hardware, specifically-purposed hardware, and/or a combination thereof.

Importantly, the WAS system 125 and any units and/or subunits of FIGS. 2 and/or 3 may be included in one or more elements of system 100 as described with reference to FIG. 1. For example, one or more elements (e.g., units and/or subunits) of the WAS system 125 may be included in the remote server 105 and/or the application servers 113.

The processing unit 202 may control one or more of the memory unit 204, the I/O unit 206, and the communication unit 208 of the WAS system 100, as well as any included subunits, elements, components, devices, and/or functions performed by the memory unit 204, I/O unit 206, and the communication unit 208. The described sub-elements of the WAS system 125 may also be included in a similar fashion in any of the other units and/or devices included in the system 100 of FIG. 1. Additionally, any actions described herein as being performed by a processor or one or more processors of a computing device (or one or more computing device processors/one or more computing system processors), may be taken by the processing unit 202 of FIG. 2 and/or FIG. 3 alone and/or by the processing unit 202 in conjunction with one or more additional processors, units, subunits, elements, components, devices, and/or the like. Further, while one processing unit 202 may be shown in FIG. 2 and/or FIG. 3, multiple processing units may be present and/or otherwise included in the WAS system 125 or elsewhere in the overall system (e.g., network system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, or any combination thereof. In some instances, Content on which the content management unit 212 may operate includes device information, user interface data, images, text, themes, audio files, video files, documents, and/or the like. Additionally, the content management unit 212 may control the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data (e.g., scanning instructions, scan data, and/or the like) described herein. In some embodiments, the GPU 216 may be utilized to render content for presentation on a computing device (e.g., via web GUI 170 shown in FIG. 1). The GPU 216 may also include multiple GPUs and therefore may be configured to perform and/or execute multiple processes in parallel. In some implementations, the GPU 216 may be used in conjunction with other subunits associated with the memory unit 204, the I/O unit 206, the communication unit 208, and/or a combination thereof.

The resource allocation unit 218 may facilitate the determination, monitoring, analysis, and/or allocation of computing resources throughout the WAS system 125 and/or other computing environments. Computing resources of the WAS system 125 utilized by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the WAS system 125, as well as hardware for responding to the computing resource needs of each unit and/or subunit. In some embodiments, the resource allocation unit 218 may utilize computing resources of a second computing environment separate and distinct from the WAS system 125 to facilitate a desired operation.

For example, the resource allocation unit 218 may determine a number of simultaneous computing processes and/or requests. The resource allocation unit 218 may also determine that the number of simultaneous computing processes and/or requests meets and/or exceeds a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the WAS system 125 and/or another computing environment.

In some embodiments, factors affecting the allocation of computing resources by the resource allocation unit 218 may include the number of computing processes and/or requests, a duration of time during which computing resources are required by one or more elements of the WAS system 125, and/or the like. In some implementations, computing resources may be allocated to and/or distributed amongst a plurality of second computing environments included in the WAS system 125 based on one or more factors mentioned above. In some embodiments, the allocation of computing resources of the resource allocation unit 218 may include the resource allocation unit 218 flipping a switch, adjusting processing power, adjusting memory size, partitioning a memory element, transmitting data, controlling one or more input and/or output devices, modifying various communication protocols, and/or the like. In some embodiments, the resource allocation unit 218 may facilitate utilization of parallel processing techniques such as dedicating a plurality of GPUs included in the processing unit 202 for running a multitude of processes.

The memory unit 204 may be utilized for storing, recalling, receiving, transmitting, and/or accessing various files and/or data (e.g., scan data, and/or the like) during operation of WAS system 125. For example, memory unit 204 may be utilized for storing, recalling, and/or updating scan history information as well as other data associated with, resulting from, and/or generated by any unit, or combination of units and/or subunits of the WAS system 125. In some embodiments, the memory unit 204 may store instructions and/or data that may be executed by the processing unit 201. For instance, the memory unit 204 may store instructions that execute operations associated with one or more units and/or one or more subunits of the WAS system 125. For example, the memory unit 204 may store instructions for the processing unit 202, the I/O unit 206, the communication unit 208, and itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored may be a command, a current operating state of WAS system 125, an intended operating state of WAS system 125, and/or the like. As a further example, data stored in the memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage. Secondary storage may be comprised of one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more data storage devices 310 (shown in FIG. 3) for storing any data described herein. For example, depending on the implementation, the one or more data storage devices may be similar to the API test data database 155 shown in FIG. 1. Additionally or alternatively, one or more secondary databases located remotely from WAS system 125 (e.g., API test data database 155 shown in FIG. 1) may be used and/or accessed by memory unit 204. In some embodiments, memory unit 204 and/or its subunits may be local to the remote server 105 and/or to the WAS system 125 and/or remotely located in relation to the remote server 105 and/or the WAS system 125.

Turning back to FIG. 2, the memory unit 204 may include subunits such as an operating system unit 226, an application data unit 228, an application programming interface 230, a content storage unit 232, and a WAS security system 160. Each of the aforementioned subunits of the memory unit 204 may be communicatively and/or otherwise operably coupled with each other and other units and/or subunits of the WAS system 125.

The operating system unit 226 may facilitate deployment, storage, access, execution, and/or utilization of an operating system utilized by WAS system 125 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with operation of the operating system and/or WAS system 125 as a whole, such as a status of computing resources (e.g., processing power, memory availability, resource utilization, and/or the like), runtime information, systems to direct execution of operations described herein, user permissions, security credentials, and/or the like.

The application data unit 228 may facilitate deployment, storage, access, execution, and/or utilization of an application utilized by WAS system 125 and/or any other computing environment described herein. For example, the WAS system 125 may be required to download, install, access, and/or otherwise utilize a software application. As such, application data unit 228 may store any information and/or data associated with an application. Application data unit 228 may further store various pieces of information and/or data associated with the operation of an application and/or with WAS system 125 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) unit 230 may facilitate deployment, storage, access, execution, and/or utilization of information associated with APIs of WAS system 125 and/or any other computing environment described herein. For example, WAS system 125 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the remote server 105 and the WAS system 125 to communicate with each other.

Figure 4:
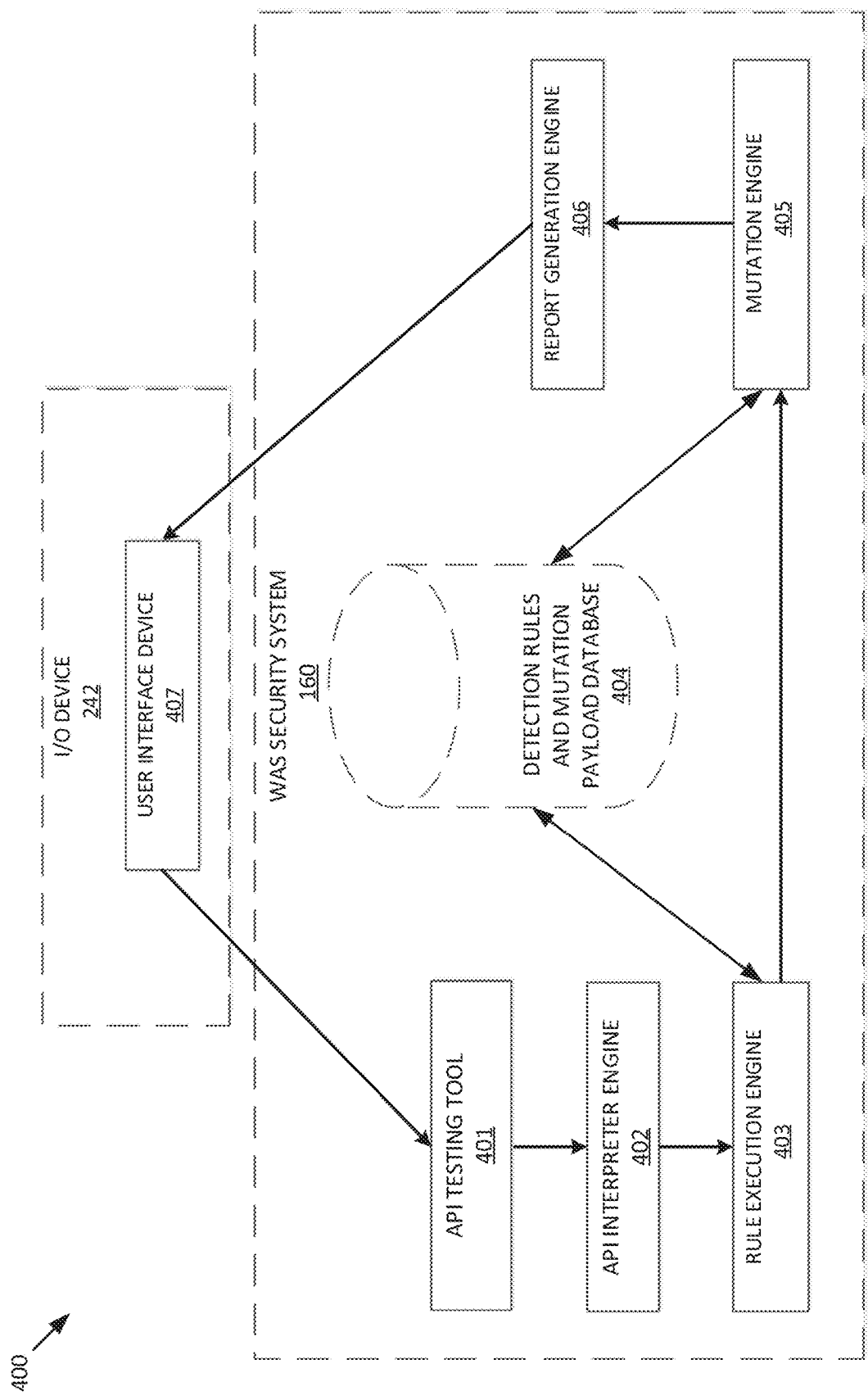
FIG. 4 is an example data flow diagram associated with securing a REST API, according to one implementation of this disclosure.

The content storage unit 232 may facilitate deployment, storage, access, and/or utilization of information associated with performance of scanning operations and/or API testing processes by WAS system 125 and/or any other computing environment described herein. In some embodiments, content storage unit 232 may communicate with a content management unit 212 to receive and/or transmit content files (e.g., media content). The WAS security system 160 shown in the memory unit is further discussed with respect to FIG. 4. According to some embodiments, the WAS security system 160 may also include instructions associated with one or more security products/systems to facilitate the determining vulnerabilities associated with a given API as well as detecting threats posed by threat-actors or hackers. For example, the WAS security system 160 may also include threat detection logic associated with access control software, anti-keyloggers, anti-malware, anti-spyware, anti-subversion software, anti-tamper software, antivirus software, cryptographic software, computer-aided dispatch (CAD), Firewall (web or otherwise), IDS, IPS, log management software, records management software, Sandboxes, security information management, Security information and event management (STEM) software, anti-theft software, parental control software, cloud-based security protection, and/or the like.

The I/O unit 206 may include hardware and/or software elements for the WAS system 125 to receive, and/or transmit, and/or present information useful for securing an API from vulnerabilities and/or other malware scanning operations and/or other processes as described herein. For example, elements of the I/O unit 206 may be used to receive input from a user of the WAS system 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with WAS system 125. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with API threat scanning, detection, displaying visual representations of report associated with the scanning and detections, displaying visual representations of remediation strategies against detected threats.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may utilize a driver 246 (or multiple drivers) to calibrate I/O device 242. For example, driver 246 may include software that is to be installed by I/O calibration unit 244 so that an element of WAS system 125 (or an element of another computing environment) may recognize and/or integrate with I/O device 242 for the API threat scanning operations and/or API threat detection processes described herein.

The communication unit 208 may facilitate establishment, maintenance, monitoring, and/or termination of communications between WAS system 125 and other computing environments, third party server systems, and/or the like (e.g., between the remote server 105 and the WAS system 125). Communication unit 208 may also facilitate internal communications between various elements (e.g., units and/or subunits) of WAS system 125. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for WAS system 125 by way of a network. For example, network protocol unit 248 may detect and/or define a communication protocol required by a particular network and/or network type. Communication protocols utilized by network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for WAS system 125 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing API scanning operations and/or other API threat detection processes described herein.

The application programming interface (API) gateway 250 may facilitate other devices and/or computing environments to access API unit 230 of memory unit 204 of WAS system 125. For example, a WAS system 125 may access API unit 230 of WAS system 125 via API gateway 250. In some embodiments, API gateway 250 may be required to validate user credentials associated with a user of an endpoint device prior to providing access to API unit 230 to a user. API gateway 250 may include instructions for WAS system 125 to communicate with another device and/or between elements of the WAS system 125.

The encryption engine 252 may facilitate translation, encryption, encoding, decryption, and/or decoding of information received, transmitted, and/or stored by the WAS system 125. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for WAS system 125. In some embodiments, communication device 254 may include one or more radio transceivers, chips, analog front end (AFE) units, antennas, processing units, memory, other logic, and/or other components to implement communication protocols (wired or wireless) and related functionality for facilitating communication for WAS system 125. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Workflow

The WAS security system 160, according to some implementations, includes a Dynamic Application Security Testing (DAST) software product/tool. The DAST software tool can help entities/users (e.g., companies, businesses, individuals, schools, etc.) to automatically crawl and detect security flaws and/or vulnerabilities in their web applications and/or REST APIs. A DAST tool can scan web applications and/or REST APIs using the methodologies provided in this disclosure. A DAST tool can be desktop-based or cloud-based. Additionally, the DAST tool described herein can have a user interface (UI) for users to interact (e.g., configure a security scan for APIs associated with target Web Application) with the DAST tool. The DAST tool can also generate scan data (e.g., reports, analysis data, etc.) after a scan or security assessment of APIs. According to some implementations, the DAST tool may include an API testing tool, an API interpreter engine, a rules execution engine, a mutations engine, a report generation engine, and a detection rules and mutation payload database as further discussed with reference to FIG. 4.

According to some implementations, the UI 407 of the DAST tool may receive data (e.g., data useable to generate a scan configuration file including API workflow data and/or a workflow data including a script, etc.) and other instructions to initiate or lunch a scan to assess a security posture of an API (e.g., REST API). Scanning the API related data (e.g., collection of API requests) to determine a security posture of the API may comprise a plurality of phases. For example, the scanning may include a crawl phase, a passive detection phase where passive detection rules are applied, an active detection phase including executing a fuzzing operation, and a report generation phase. Assuming a scan configuration file comprised in data received at the UI of the DAST includes an application uniform resource locator (URL), the crawl phase, for example, may include the API testing tool 401 crawling the URL and/or content associated with the URL responsive to launching of the scanning. Crawling the URL may include analyzing content associated with the URL and identifying and indexing links associated with the URL. In the crawl phase, the DAST tool may parse URL data and/or collected responses associated with crawling the URL to generate for example, identified links. The DAST tool may further crawl the collected data and/or the identified links and transmit results (e.g., crawled link responses) from crawling the collected data to the passive detection phase of the scanning. For example, parsing the URL to identify and collect links associated with the URL as well as crawling the collected links, in some embodiments is an iterative process conducted to ensure real-time updates to, for example, crawled link responses.

According to some implementations, results (e.g., crawled link response) from the API testing tool 401 may be interpreted and/or translated by the API interpreter engine 402. For example, the API testing tool may be a tool that is directly integrated or built into the WAS security system 160 as shown. This direct integration of the API testing tool within the WAS security system 160 has many benefits. For example, outputs/results from various testing phases/stages of a given API using the API testing tool integrated within the WAS security system 160 and/or outputs from other modules within the WAS security system 160 may be concurrently and/or simultaneously assessed or otherwise used in combination to develop holistic tests of the security posture of a given API. For instance, the integrated API testing tool (e.g., Postman tool) may be implemented within the WAS security system 160 to natively execute "pre-request" scripts and "test" scripts provided in an API workflow data. Results from executing the "pre-request" scripts and/or "test" scripts may then be subsequently used within the WAS security system 160 to generate security data (e.g., scan data, vulnerability reports, etc.). According to some implementations, the "pre-request" and "test" scripts include JavaScript code that can be executed within the WAS security system 160 before sending and/or receiving HTTP requests associated with testing a given API using the WAS security system 160.

Accordingly, the API interpreter engine 402 allows the WAS security system 160 to be compatible with the operations of a plurality of API testing tools including non-native testing tools. As used herein, "non-native tools" may refer to tools that generate data that is not in a compatible format with the WAS security system 160. According to some implementations, the API testing tool 401 is a POSTMAN testing tool configured to generate POSTMAN collection files that can be scanned by the WAS security system 160.

In some instances, one or more vulnerability tests may be executed on results from the crawl phase. For example, the rule execution engine 403 of the DAST tool may apply passive detection rules on each crawled data (e.g., crawled link). According to some embodiments, the passive detection rules include policies associated with sensitive information within the crawled data. In other implementations, the passive detection rules include policies associated with security headers of the crawled data.

If there is a match in the passive detection rules that is indicative of a security event associated with the crawled data, scan data (e.g., a first report) is generated. According to some implementations, rules data may be extracted from the detection rules and mutation payload database 404 and applied in the passive detection rules step. The passive detection rules application may be followed by the active detection phase of the scanning. In the active detection phase, the mutation engine 405 may fuzz data (e.g., crawled link content/data and/or crawled link response data) using custom data and/or custom payload and/or custom mutated data to create a custom request. The custom data and/or custom payload may be retrieved from the detection rules and mutation payload database 404. According to some implementations, fuzzing data may include automatic bug detection to assess the security and stability of applications and other software associated with an API. Following the fuzzing, the mutation engine may transmit the custom request to an application server such as the application server 113 of FIG. 1 and then analyze a response from the application server. If the security engine detects a security event associated with the response, secondary scan data (e.g., a second report) may be generated. A report generation unit 406 of the WAS security system 160 may transmit the scan data and the secondary scan data to the user interface associated with the DAST scanner. According to some implementations, the scan data and the secondary scan data may be used to secure the API against one or more vulnerabilities detected during the scanning phases. The scan data and the secondary scan data may be automatically displayable on a user interface device for easy interaction by a user.

In some implementations, the crawl phase may include determining at least one or more endpoints associated with a collection of API requests within received API related data. In such instances, crawling the collection of API requests comprises determining one or more endpoints associated with accessing a resource of the application server. In some embodiments, the collection of API requests may include one or more parameters that provide options that are passable to the application server via the plurality of API requests. In some cases, the options may include commands or methods such as POST, GET, PUT/PATCH, and DELETE that respectively create, read, update, and delete an object or resource of the application server. According to some implementations, a resource may include any data associated with the API or any data that can be accessed by a user using the API. Further, executing a vulnerability test as part of the passive and/or active detection phase, in some cases, may comprise determining a definition associated with the collection of API requests, scanning one or more parameters associated with the one or more endpoints based on the definition, and generating scan data based on the scanning. The scan data may provide an indication of a vulnerability associated with an API. The DAST tool scan report/data may help secure, using the one or more computing device processors, an API against at least one vulnerability responsive to determining that the at least one vulnerability is associated with the API.

Flowcharts

Figure 5:
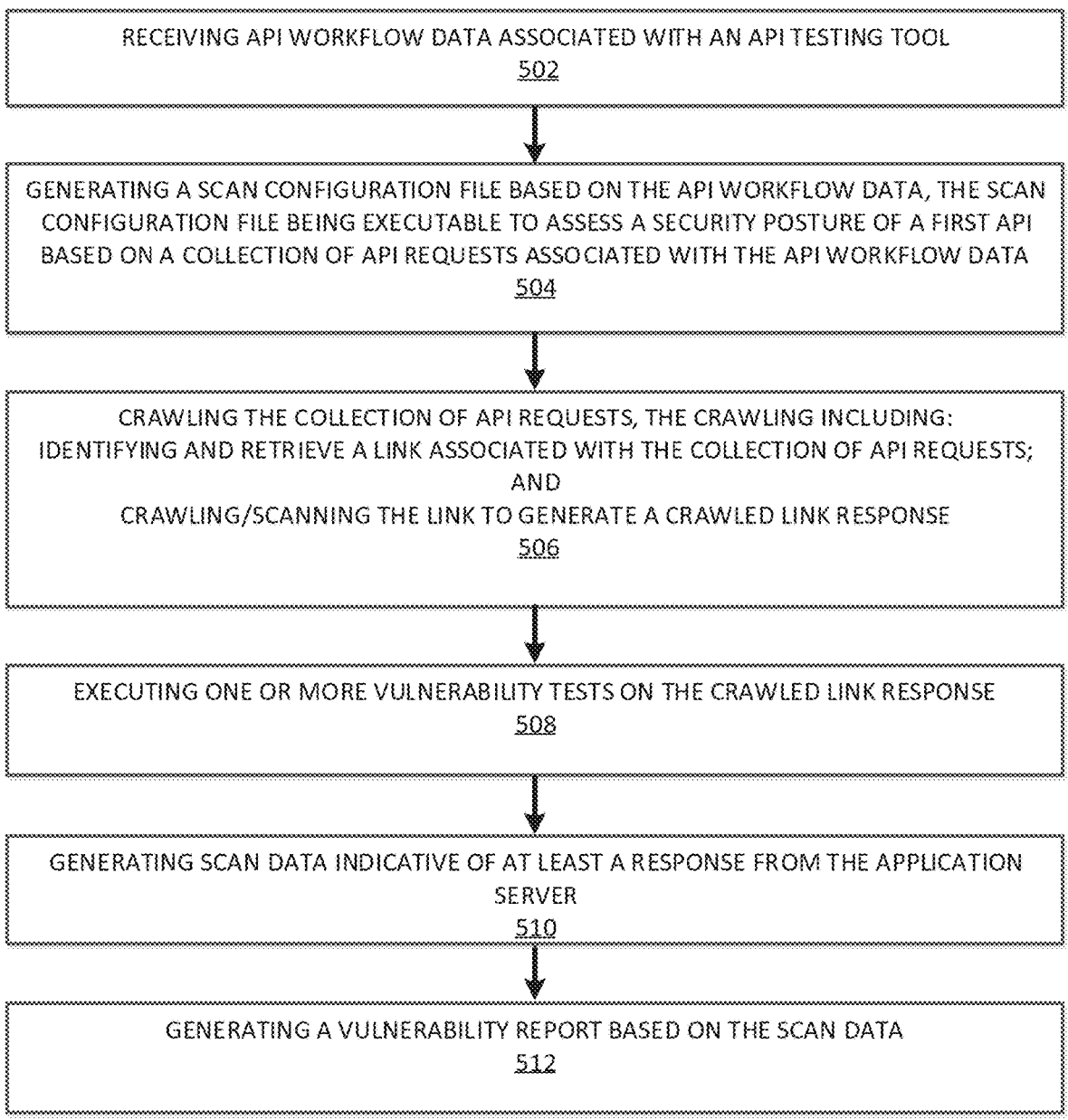
FIG. 5 is an example flowchart for securing a REST API, according to one implementation of this disclosure.
Figure 6:
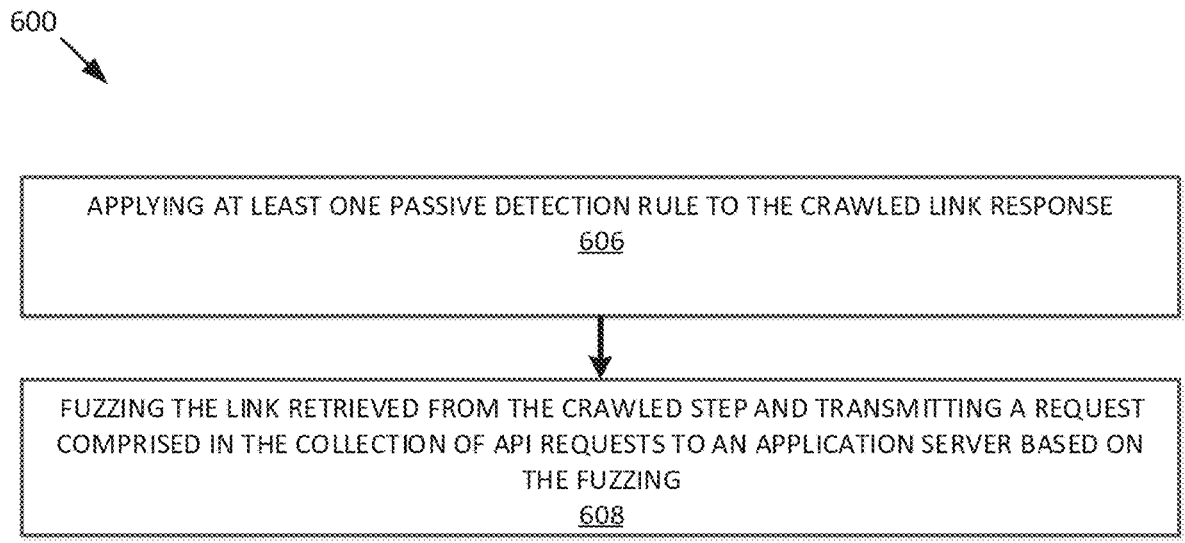
FIG. 6 is an example flowchart for executing vulnerability tests associated with securing a REST API.

FIG. 5 is an example flowchart for securing a REST API, according to one implementation of this disclosure. At block 502, a WAS security system may receive API workflow data associated with an API testing tool. The WAS security system may generate, at block 504, a scan configuration file based on the API workflow data. The scan configuration file may be executable to assess a security posture of a first API based on a collection of API requests associated with the API workflow data. At block 506, the WAS security system may crawl the collection of API requests. In some embodiments, crawling the collection of API requests includes identifying and retrieving a link associated with the collection of API requests and scanning or crawling the link to generate a crawled link response. According to some embodiments, the crawled link response may be dependent on an application server associated with an API. At block 508, the WAS security system may execute one or more vulnerability tests on the crawled link response. Executing the one or more vulnerability tests may comprise applying at least one passive detection rule to the crawled link response and fuzzing the link retrieved and transmitting the fuzzed link in a request comprised in the collection of API requests to an application server based on the fuzzing as outlined in blocks 606 and 608 of FIG. 6. According to some implementations, fuzzing a link may comprise testing a given endpoint associated with an API using a plurality of different data (e.g., payload data within the link) in order to examine predictable and/or unpredictable responses to assess a security posture of the API.

At block 510 of FIG. 5, the WAS security system may generate scan data indicative of at least one vulnerability associated with a response from the application server responsive to transmitting the fuzzed link to the application server. The WAS security system may further generate a vulnerability report at block 512. The vulnerability report, according to some implementations, may be used to secure, the first API against at least one vulnerability. In some embodiments, the vulnerability report includes data associated the vulnerabilities discussed above. In some instances, the vulnerability report includes data associated with the crawled link and/or API request link for which a vulnerability is detected. In some cases, the vulnerability report includes data associated with a mutated payload (e.g., custom mutated data and/or data executable by the mutation engine 405) used for a vulnerability test of the API. According to some implementations, the vulnerability report includes a method of verification for each detected vulnerability (e.g., a method associated with finding a predictable text and/or other content in a fuzzed link response, etc.)

In some embodiments, the first API is a representational state transfer (REST) API and the API testing tool mentioned in association with flowchart 500 includes a POSTMAN tool. Additionally, the API workflow data can include a script associated with the API testing tool. Moreover, the collection of API requests can comprise a collection of tests indicative of scenario-based tests and sequence-based tests associated with the API workflow data. In some cases, the sequence-based tests leverages relationships between content associated with the API workflow data.

The at least one vulnerability discussed in association with FIG. 5 may include a cross site request forgery (CSRF) vulnerability where a hacker takes actions including one or more of transferring resources and changing an email address in an authenticated web application associated with the first API without a user's knowledge. A cross site scripting (XSS) vulnerability where a malicious script is injected into a vulnerable application associated with the first API to reveal a user's session cookies. In some embodiments, the one or more vulnerabilities could include an SQL injection vulnerability where instead of inputting valid data, a user inputs an SQL statement that is executed on a database associated with the first API. Vulnerabilities (e.g., man-in-the-middle and distributed denial of service (DDoS)) associated with APIs other than those discussed above are also contemplated herein.

In some cases, a plurality of different vulnerability tests may be executed as part of executing the one or more vulnerability tests discussed above. Moreover, the API testing tool may be natively integrated into the web application scanner (e.g., WAS security system 160) such that a user interface of the web application scanner receives the API workflow data and displays scan data. In addition, the web application scanner may be a cloud-based security system according to some embodiments.

In the preceding description, for purposes of explanation, numerous specific details are set forth in order to provide a thorough understanding of the disclosure. It will be apparent, however, that the disclosure can be practiced without these specific details. In other instances, structures and devices have been shown in block diagram form in order to avoid obscuring the disclosure. For example, the present disclosure has been described in some implementations above with reference to user interfaces and particular hardware but is not necessarily limited in implementation by said user interfaces and particular hardware.

Reference in the specification to "one implementation," "an implementation," "an embodiment," and "some embodiments" means that a particular feature, structure, or characteristic described in connection with the implementation or embodiment is included in at least one implementation or embodiment of the disclosure. The appearances of the phrases "one implementation," "an implementation," "an embodiment," and "some embodiments" in various places in the specification are not necessarily all referring to the same implementation.

Some portions of the detailed descriptions above are presented in terms of symbolic representations of operations on data bits within a computer memory. These symbolic representations are the means used by those skilled in the data processing arts to most effectively convey the substance of their work to others skilled in the art. These symbolic representations can take the form of electrical or magnetic signals capable of being stored, transferred, combined, compared, and otherwise manipulated. It has proven convenient at times, principally for reasons of common usage, to refer to these electrical or magnetic signals as bits, values, elements, symbols, characters, terms, numbers, or the like.

Unless specifically stated otherwise as apparent from the following discussion, it is appreciated that throughout the description, discussions utilizing terms such as "processing" or "computing" or "determining" or "displaying" or the like, refer to the action and processes of a computer system or processes executed by one or more computing device processors, or similar electronic computing device, that manipulates and transforms data represented as physical (electronic) quantities within the computer system's registers and memories into other data similarly represented as physical quantities within the computer system memories or registers or other information storage, transmission or display devices.

Furthermore, some embodiments of the disclosure can take the form of a computer program product accessible from a non-transitory computer-usable or computer-readable medium providing program code for use by, or in connection with a computer or any instruction execution system. For the purposes of this description, a non-transitory computer-usable or computer-readable medium can be any apparatus that can contain or store the program code for use by, or in connection with an instruction execution system, an apparatus, or a device associated with the networked system of FIG. 1.

The disclosure can take the form of an entirely hardware implementation, an entirely software implementation or an implementation containing both hardware and software elements. In some implementations, the disclosure is implemented in software, which includes but is not limited to firmware, resident software, microcode, and other computer readable code.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the systems, routines, features, attributes, methodologies and other aspects are not mandatory or significant, and the mechanisms that implement the present disclosure or its features may have different names, divisions and/or formats. Also, wherever a component, an example of which is a system, of the present disclosure is implemented as software, the component can be implemented as a standalone program, as part of a larger program, as a plurality of separate programs, as a statically or dynamically linked library, as a kernel loadable system, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A method for securing an application programing interface (API) against a vulnerability, the method comprising:
   accessing, using one or more computing device processors, an API testing tool;
   generating or receiving, using the one or more computing device processors and the API testing tool, API workflow data;
   generating or accessing, using the one or more computing device processors, and based on the API workflow data, a scan configuration file, the scan configuration file being executable;
   determining, using the one or more computing device processors, at least one endpoint;
   determining, using the one or more computing device processors, that the at least one endpoint accesses a resource of an application server via a first API;
   executing, using the one or more computing device processors, one or more commands associated with API requests, the one or more commands comprising at least one of a POST command, a GET command, a PUT command, and a DELETE command;
   crawling, using the one or more computing device processors, content associated with a link comprised in or associated with the API requests to generate crawled data;
   executing, using the one or more computing device processors, and based on the crawled data, one or more vulnerability tests;
   determining, using the one or more computing device processors, and based on the one or more vulnerability tests, API data associated with the one or more vulnerability tests;
   generating, using the one or more computing device processors, and based on the API data, scan data indicative of at least one vulnerability associated with the first API; and
   generating, using the one or more computing device processors, a vulnerability report based on the scan data.

2. The method of claim 1, wherein at least one of:
   the first API is a representational state transfer (REST) API,
   the API testing tool includes a Postman tool, and
   the API workflow data includes a script associated with the API testing tool.

3. The method of claim 1, wherein the at least one vulnerability includes one or more of:
   a cross site request forgery vulnerability,
   a cross site scripting vulnerability, and
   a structured query language (SQL) injection vulnerability.

4. The method of claim 1, wherein the resource of the application server comprises one of first data associated with the first API or second data that is accessed using the first API.

5. The method of claim 1, further comprising securing, based on the vulnerability report, the first API against the at least one vulnerability.

6. The method of claim 1, wherein at least one of:
   the API testing tool is integrated into a web application scanner,
   the web application scanner includes a user interface configured to receive the API workflow data, and
   the web application scanner is a cloud-based security system.

7. The method of claim 1, wherein the vulnerability report includes one or more of:
   first data associated with crawling the link comprised in or associated with the API requests or the content associated with the link comprised in or associated with the API requests,
   second data associated with a payload used for a vulnerability test of the first API, and a verification operation for a vulnerability.

8. The method of claim 1, further comprising:
   generating a crawled link response based on crawling the link comprised in or associated with the API requests or the content associated with the link comprised in or associated with the API requests,
   executing the one or more vulnerability tests on the crawled link response based on fuzzing the link, thereby generating a fuzzed link, transmitting the fuzzed link to the application server, and
   generating the scan data or second scan data in response to or based on the transmitting the fuzzed link to the application server.

9. The method of claim 8, wherein the crawled link response is dependent or based on the application server.

10. The method of claim 1, further comprising testing the at least one endpoint using the link to determine a security posture of the first API.

11. The method of claim 1, wherein the API requests comprise one or more tests indicative of scenario-based tests or sequence-based tests associated with the API workflow data.

12. The method of claim 11, wherein the sequence-based tests are based on a relationship associated with content associated with the API workflow data.

13. A system for securing an application programing interface (API) against a vulnerability, the system comprising:
   one or more computing device processors and memory storing instructions that are executable by the one or more computing device processors to:
   access an API testing tool;
   generate or receive, using the API testing tool, API workflow data;
   generate or access, based on the API workflow data, a scan configuration file, the scan configuration file being executable;

determine at least one endpoint;
determine that the at least one endpoint accesses a resource of an application server via a first API;
execute one or more commands associated with API requests, the one or more commands comprising at least one of a POST command, a GET command, a PUT command, and a DELETE command;
crawl content associated with a link comprised in or associated with the API requests to generate crawled data;
execute, based on the crawled data, one or more vulnerability tests;
determine, based on the one or more vulnerability tests, API data associated with the one or more vulnerability tests;
generate, based on the API data, scan data indicative of at least one vulnerability associated with the first API; and
generate a vulnerability report based on the scan data.

14. The system of claim 13, wherein the resource of the application server comprises one of first data associated with the first API or second data that is accessed using the first API.

15. The system of claim 13, wherein the instructions are further executable by the one or more computing device processors to secure, based on the vulnerability report, the first API against the at least one vulnerability.

16. A computer program for securing an application programing interface (API) against a vulnerability, the computer program comprising instructions on a non-transitory computer useable medium that are executable by a computer processor to:
access an API testing tool;
generate or receive, using the API testing tool, API workflow data;
generate or access, based on the API workflow data, a scan configuration file, the scan configuration file being executable;
determine at least one endpoint;
determine that the at least one endpoint accesses a resource of an application server via a first API;
execute one or more commands associated with API requests, the one or more commands comprising at least one of a POST command, a GET command, a PUT command, and a DELETE command;
crawl content associated with a link comprised in or associated with the API requests to generate crawled data;
execute, based on the crawled data, one or more vulnerability tests;
determine, based on the one or more vulnerability tests, API data for the API requests;
generate, based on the API data, scan data indicative of at least one vulnerability associated with the first API; and
generate a vulnerability report based on the scan data.

17. The computer program of claim 16, wherein the instructions are further executable by the computer processor to secure, based on the vulnerability report, the first API against the at least one vulnerability.

18. The method of claim 1, wherein the API testing tool implements one or more dynamic application security testing operations, wherein the scan configuration file comprises data generated or received based on execution of the one or more dynamic application security testing operations, the scan configuration file is crawlable, the at least one endpoint comprises one or more computing systems coupled to a representational state transfer API, and the content associated with the link comprises at least one of media content, device information, user interface data, images, text, themes, audio files, video files, and documents.

19. The method of claim 1, further comprising at least one of: testing the at least one endpoint to examine one or more responses to assess a security posture of the first API, applying at least one passive detection rule to a crawled link response, fuzzing the link, thereby resulting in a fuzzed link, and transmitting the fuzzed link to the application server.

20. The method of claim 1, wherein the at least one of the POST command, the GET command, the PUT command, and the DELETE command comprises at least two of the POST command, the GET command, the PUT command, and the DELETE command.

21. The method of claim 1, wherein the at least one of the POST command, the GET command, the PUT command, and the DELETE command comprises at least three of the POST command, the GET command, the PUT command, and the DELETE command.

22. The method of claim 1, wherein the at least one of the POST command, the GET command, the PUT command, and the DELETE command comprises the POST command, the GET command, the PUT command, and the DELETE command.

* * * * *